350-166
SR
1/10/78 XR 4,068,260

United States Patent [19]
Ohneda et al.

[11] 4,068,260
[45] Jan. 10, 1978

[54] COMBINATION OPTICAL LOW PASS FILTER CAPABLE OF PHASE AND AMPLITUDE MODULATION

[75] Inventors: Shoichi Ohneda, Wakayama; Yukio Okano, Mimamikawachi, both of Japan

[73] Assignee: Minolta Camera Kabushiki Kaisha, Osaka, Japan

[21] Appl. No.: 768,861

[22] Filed: Feb. 15, 1977

[30] Foreign Application Priority Data

Feb. 20, 1976 Japan .................................. 51-16978

[51] Int. Cl.$^2$ ........................... H04N 9/22; G02B 5/28
[52] U.S. Cl. ........................................ 358/44; 350/166
[58] Field of Search ............................. 358/43, 44, 55; 350/162 SF, 164, 166

[56] References Cited

U.S. PATENT DOCUMENTS 4,009,939 3/1977 Okano .................................... 358/44

*Primary Examiner*—John C. Martin
*Attorney, Agent, or Firm*—Harold L. Jackson; Stanley R. Jones; Joseph W. Price

[57] ABSTRACT

A combination optical low pass filter adapted for use in a single or double tube color television camera is provided with a phase retarding pattern on a transparent substrate. The pattern includes optical elements having a transmissivity which varies with the wavelength of light passing there through so that the optical low pass filter functions as both a phase diffraction and an amplitude diffraction filter. Medium indexed filler material can further supplement the pattern to eliminate any light scattering.

21 Claims, 12 Drawing Figures

COMBINATION OPTICAL LOW PASS FILTER CAPABLE OF PHASE AND AMPLITUDE MODULATION

BACKGROUND OF THE INVENTION

1. Field of the Invention

The present invention relates to an optical low pass filter to be used in an optical system for a single tube or double tube color television camera and more particularly to an optical filter selectively capable of both phase and amplitude modulation.

2. Description of the Prior Art

There have been proposed and known various types of optical low pass filters in the prior art which are used in single or double tube color television cameras for eliminating cross-talk between luminance and chrominance signals. One example is a phase grating filter in which transparent optical elements such as laminae, dots, strips or the like of given size are regularly or random disposed on a transparent substrate to cause phase retardation, see for example, U.S. Pat. No. 2,733,291, U.S. Pat. No. 3,681,519 and U.S. Pat. No. 3,756,695. These type of optical filters can provide a signal low pass effect without a substantial loss of light during the transmission, and further desired OTF (optical transfer function) characteristics can be obtained in these optical filters by selecting the size of the optical elements. The OTF characteristic obtained through these phase grating low pass filters, however, varies depending on the wavelength of light passing there through because the OTF characteristic is a function of optical thickness of the optical elements which is related to the wavelength.

The prior art has also used amplitude modulated optical filters such as shown in U.S. Pat. No. 3,566,013 which discloses an amplitude type low pass filter having alternative and parallel strips of different transmissivity. According to this type of optical filter, the OTF characteristics will not vary in accordance with the wavelength. In addition, the OTF value can be designed to become zero at a predetermined cutoff spatial frequency. This latter property may be of advantage for the primary purpose preventing interference and false signals between the chrominance and luminous signals. However, it sometimes is desirable or necessary that the OTF does not become zero for all wavelengths, for instance, as pointed out in U.S. Pat. No. 3,911,479. Further, an amplitude type of filter has the disadvantage of causing light loss when the light passes there through.

Since the television industry is extremely cost competitive, there is a continual desire to improve the video encoding performance while reducing cost. Thus, any optical element that can perform more than one task would be highly desirable.

SUMMARY OF THE INVENTION

A primary object of the present invention is to provide an improved optical low pass filter having the joint advantages of both the phase type and the amplitude type of optical filters. Another object of the present invention is to provide an optical low pass filter having different OTF characteristics for different spectral bands or wavelengths of light. Still another object of the present invention is to provide an optical low pass filter in which the cutoff frequency varies depending on wavelength or spectral band of light passing there through but which does not require a complex pattern of gratings. Still another object of the present invention is to provide an optical low pass filter as mentioned above and for which various patterns of optical elements are available. A still further object of the present invention is to provide an optical low pass filter which can reduce the amount of light of a designated spectral band passing there through.

In order to accomplish these objects a combination phase and amplitude optical filter for modulating light in a color television video system is provided and includes a transparent substrate supporting a phase retarding layer. The layer is capable of providing an optical transfer function value characteristic of cutting off the transmittance of high spatial frequency signal components of at least one or more wavelengths while passing at least another wavelength above the cutoff frequencies. The phase retarding layer further includes a plurality of optical elements having a plurality of sublayers of respective different indices of refraction. The relative optical thicknesses and index of refraction of each layer is selected to provide a wavelength variance in the transmissivity of light energy passing through each optical element for at least two different bandwidths in the visual spectrum.

The objects and features of the present invention which are believed to be novel are set forth with particularity in the appended claims. The present invention, both as to its organization and manner of operation, together with further objects and advantages thereof, may be be understood by reference to the following description, taken in connection with the accompanying drawings.

DESCRIPTION OF THE PREFERRED EMBODIMENTS

The following description is provided to enable any person skilled in the optical design and video transmission art to make and use the invention and it sets forth the best modes contemplated by the inventors in carrying out their invention. Various modifications, however, will remain readily apparent to those skilled in the above arts, since the generic principles of the present invention have been defined herein specifically to provide a relatively economical and easily manufactured optical filter.

Figure 1:
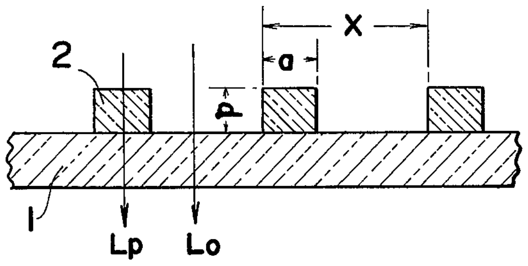
FIG. 1 is a schematic cross-sectional view of a conventional optical low pass filter.

Referring to FIG. 1, a cross-sectional view of a conventional phase retardation optical low pass filter is disclosed. The low pass filter has a rectangular cross-sectional wave shape pattern 2 supported on a transparent substrate 1. The phase elements 2 can cause phase retardation in the light energy, $L_p$, that passes there through and thereby causes a phase difference between the light $L_p$, and the light $L_o$ which passes through only the substrate 1. The height, *d*, and the width, *a*, of each phase element 2, along with the period, *x*, of the gratings can be determined in accordance with the desired cutoff frequency and the intended position of the low pass filter in the color television optical system.

The individual optical phase elements 2, that form the grating pattern on the conventional low pass filter, are usually formed of a single transparent material for example magnesium floride, MgF or silicon dioxide, $SiO_2$, which preferably has a refractive index lower than that of the substrate so that the individual optical phase elements will function as anti-reflection layers as well as preventing or avoiding light loss due to reflection at the surface and by absorption there through. By selecting material of a relative low index of refraction for the optical phase elements, the intensity of the light, $L_p$ passing through the optical phase element in the substrate will be substantially equal to that of the light, $L_o$, passing through only the substrate.

Figure 2:
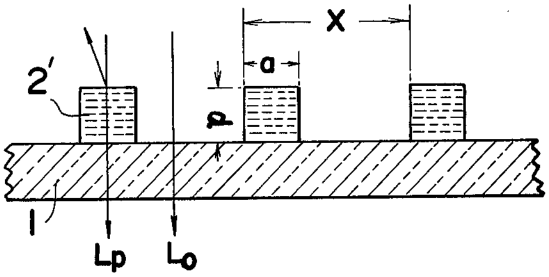
FIG. 2 is a schematic cross-sectional view of an optical low pass filter according to the present invention.
Figure 3:
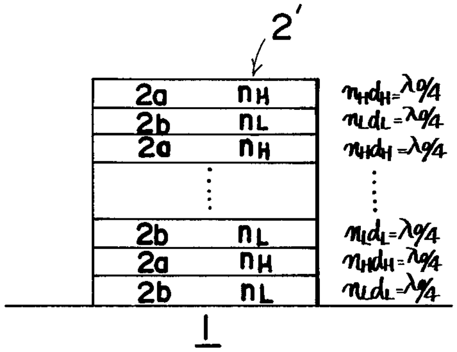
FIG. 3 is an enlarged schematic cross-sectional view of a single optical phase element.

In accordance with the present invention, the optical phase elements, 2' that are positioned on a transparent substrate 1, as shown in FIG. 2 and FIG. 3 are formed from a plurality of sublayers to provide a multi-layer construction of respectively different refractive indices. By an appropriate selection of the optical thickness of these layers, the transmissivity of the optical elements can vary depending upon the incident wavelength of light traversing the element. Accordingly, an optical low pass filter of the present invention can function as a complex amplitude grating or black and white grating for certain wavelengths of light and as a phase grating for other wavelengths.

Referring specifically to FIG. 2, a symbol A, can represent the ratio of the amplitude $A_p$ of the light $L_p$ passing through both the optical phase element 2', and the substrate 1 to the amplitude $A_o$ of the light $L_o$ passing through only the substrate as follows:

$$A = (Ap/Ao) \tag{1}$$

If the optical phase elements 2' are appropriately designed, as known in the prior art, to consist of multiple layers of appropriately chosen indices of refraction with appropriate thickness, then the ratio A will change with the wavelength or the spectral band of the light passing through the optical elements, see U.S. Pat. No. 3,922,068. Generally, a prior art optical phase element will have the ratio A equal to 1 or approximately 1 for phase gratings that have transparent optical phase elements.

In accordance with the present invention, the ratio of our optical phase elements 2' will have the value of A less than 1 for certain preselected spectral bands so that our grating is capable of functioning as a complex amplitude grating. When the complex amplitude grating of the present invention is appropriately positioned in an image forming optical system, the intensity distribution, Cm, in an image of a line formed by the optical system will be as follows;

$$Cm = \left\{ \frac{\sin m\pi}{m\pi} - \frac{a}{X} \frac{\sin m\pi \frac{a}{X}}{m\pi \frac{a}{X}} \right\}^2 + A^2 \frac{a^2}{X^2} \left\{ \frac{\sin m\pi \frac{a}{X}}{m\pi \frac{a}{X}} \right\}^2 + 2A \frac{a}{X} \cos\delta \left\{ \frac{\sin m}{m} - \frac{a}{X} \frac{\sin m\pi \frac{a}{X}}{m\pi \frac{a}{X}} \right\} \left\{ \frac{\sin m\pi \frac{a}{X}}{m\pi \frac{a}{X}} \right\} \tag{2}$$

wherein $m$ = order of spectrum $x$ = distance between adjacent phase elements $a$ = width of each phase element $\delta$ = phase difference between the lights $L_p$ and $L_o$ As can be seen from the above equation (2), the intensity distribution Cm, transmitted through the complex-amplitude grating pattern is a function of $\delta$, $a/X$ and A and further the complex-amplitude grating can function as an optical low pass filter providing the following conditions are satisfied;

$$1 - 2(a/X) + 2A\, a/X \cos\delta \leqq 0 \tag{3}$$

$$A^2\left(2\frac{a}{X} - 1\right) + 2A\left(1 - \frac{a}{X}\right)\cos\delta \leqq 0 \tag{4}$$

Figure 4:
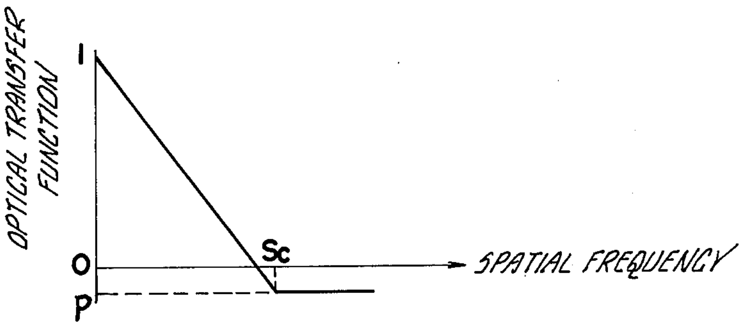
FIG. 4 is a diagram showing an optical transfer function characteristic.

When the conditions of equations (3) and (4) are satisfied, the optical transfer function response will be as set forth in FIG. 4. Accordingly, the value of the OTF P will be zero or negative at the point Sc.

Since A and $\delta$ are a function of the wavelength of light, the complex amplitude grating will change its cutoff characteristic as an optical low pass filter as a function of the wavelength of the light passing there through. It is necessary, however, that the conditions set forth in equations (3) and (4) be satisfied for at least some proper spectral bandwidth in the visual light region. Hence, in case $\delta = \pm m\pi$ (wherein $m$ may be any positive integer) then the following condition can be derived from equations (3) and (4);

$$\tfrac{1}{4} \leqq (a/X) \leqq \tfrac{3}{4}$$

In addition, for a spectral band where A can be considered zero, equation (3) above will be reduced to;

$$(a/X) \geqq (\tfrac{1}{2})$$

Therefore, if the following condition is met;

$$\tfrac{1}{2} \leqq a/X \leqq (\tfrac{3}{4}) \quad (5)$$

in a phase grating as disclosed in FIGS. 2 and 3, then that grating can operate as a black and white grating type low pass filter, i.e., amplitude type low pass filter. This particular limit for $a/X$, set forth in equation (5), is also effective to provide a filter that can function as a phase grating low pass filter for a spectral band of light wherein A can be considered one. For an additional understanding of the background theory references is made to U.S. Pat. No. 3,756,695 which is incorporated by reference herein.

Thus, the phase grating optical elements of the present invention can operate as a phase grating low pass filter for the spectral band wherein A can be considered one, that is for a band where the phase elements are transparent and as a black and white, i.e., amplitude type low pass filter for a spectral band wherein, A can be considered zero, that is for a band wherein the phase elements are opaque. It is necessary that the optical phase elements be composed of a plurality of sublayers of different indices to selectively transmit light with respect to wavelength and further that the ratio of width a, of each phase element to the distance or grating period X, between each pair of adjacent phase elements satisfy the above equation (5). In those cases wherein, A, is neither one nor zero, the phase grating elements can function as optical low pass filter provided that values of A, $\delta$ and $a/X$ satisfy the conditions of equations (3) and (4) for at least some spectral band of visual light.

A specific embodiment of the present invention can utilize a rectangular wave-shape grating pattern as disclosed in FIG. 2 with a multi-layer structure for the optical elements as disclosed in FIG. 3. The width, *a,* of the phase element can be set forth as follows:

$$a = \tfrac{2}{3} X$$

wherein *X* is the distance between each pair of adjacent optical phase elements 2'.

In addition, each optical phase element 2' comprises at least two kinds of sublayers **2*a*, 2*b*** respectively overlayed for a total of 14 sublayers having individual optical thicknesses of 175m$\mu$. Alternate layers are composed of a high index of refraction material for example, $N_H$ equals 2.3 and a low index of refraction material, for example, $N_L$ equals 1.38.

Thus, the total geometric thickness *d,* of each optical phase element 2' is 1420m$\mu$. Since the optical thickness of the individual layers **2*a* and 2*b*** are respectively $N_H \times dH$ and $N_L \times dL$. The total geometric thickness *d,* of each phase element 2' is $(dH + dL) \times 7$, with a total optical thickness of each phase element 2' being;

$$(nHdH + nLdL) \times 7 = 2 \times 175\ (\text{m}\mu) \times 7 = 2450\ (\text{m}\mu)$$

Accordingly, the optical path difference between the light passing through the optical element phase portion and the light passing through the nonphase portion will be;

$$2450\text{m}\mu - 1420\text{m}\mu = 1030\text{m}\mu.$$

Figure 5:
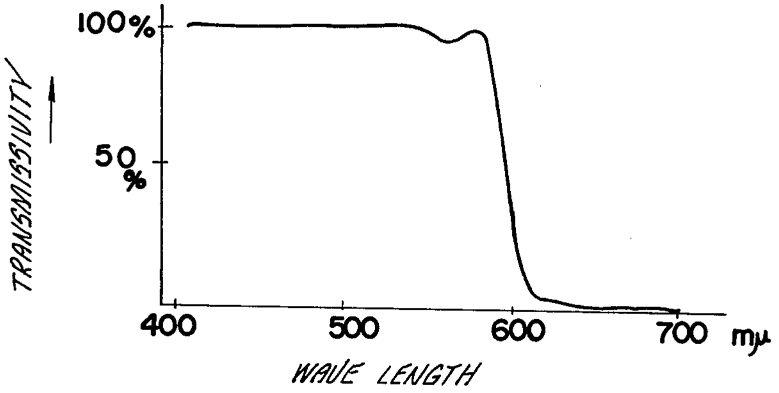
FIG. 5 is a diagram showing spectral absorption characteristics of the optical low pass filter of one embodiment of the present invention.

The resultant transmissivity will change with wavelength as disclosed in FIG. 5 with the boundary or transformation point occurring at about 580m$\mu$ to 600m$\mu$. Thus, the transmissivity is 100% for light of a wavelength smaller than the border value, i.e., blue and green regions, while the transmissivity is substantially zero for the light energy of a wavelength larger than the border value, i.e., in the red region. Accordingly, this optical phase grating can function as a phase grating low pass filter for light in the blue and green spectral regions where A equals 1 and is a black and white grating low pass filter for the light in the red region.

Figure 6:
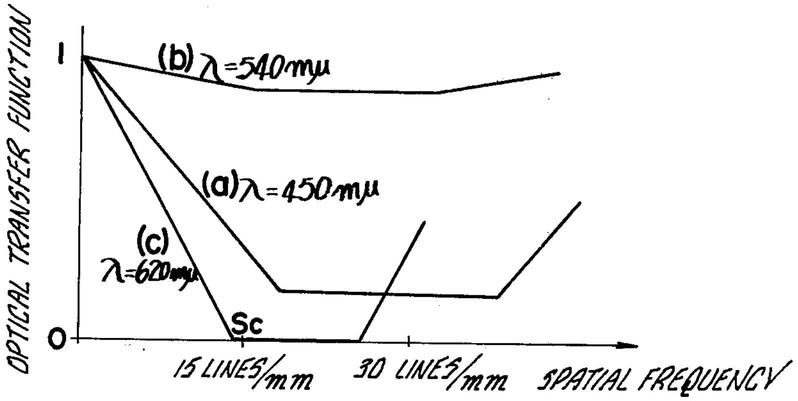
FIG. 6 is a diagram showing optical transfer function characteristics of an embodiment of the present invention, for various spectral bands.

If we accept light of 450 as a wavelength represented of the blue light, and 540m$\mu$ as a wavelength represented of green light then the phase difference $\lambda$ for these lights are respectively $4.6\pi$ and $3.8\pi$ and the response function or OTF (optical transfer function) characteristic for these wavelengths will be respectively as shown in FIG. 6 as curves (b) and (a). If we accept 620m$\mu$ as a wavelength representative of light in the red region, then the phase grating functions as a black and white grating low pass filter and the OTF characteristic will be as shown in curve (c) in FIG. 6.

As can be seen from FIG. 6, the grating of this specific embodiment of the present invention will change its high-frequency cutoff characteristics depending on the wavelength of light passing there through. That is, the grating can cutoff the high frequency component in the image formed by the image forming optical system including the above grating, in the blue and red region of the spectral band but does not cutoff the green region. As an additional feature of the present invention, it should be noted that the grating of this embodiment allows only about one-third of the red and infrared light region to pass through the grating. The optical phase portions of the grating which occupy two-thirds of the total area of the grating (since $a/X$ equals $\tfrac{2}{3}$), reflect the light of the wavelength larger than 600m$\mu$ and does not allow it to pass there through. This provides an additional advantage because it is known that the image pickup tubes for color television cameras have a higher sensitivity for light in the red or infrared region than in the other regions. The optical grating filter of the present invention is therefore capable of compensating the sensitivity of the image pickup tube by reducing red and infrared components of the light which would normally reach the photosensitive surface of the tube. Because of this feature of the present invention, it is possible to utilize an optical image forming system without the necessity of including a red compensating cutback filter in the color television optical system to balance the spectral sensitivity of the color television camera.

Figure 7:
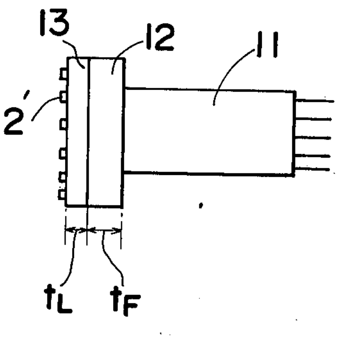
FIG. 7 is a schematic view showing one arrangement of an optical low pass filter of an embodiment of the present invention.

Referring to FIG. 7, a schematic side view of an image pickup tube 11 is disclosed to show an example of one arrangement of the optical grating filter as mentioned above. The optical phase elements 2', as explained above, are formed on a transparent and plane parallel substrate 13 to form the optical low pass filter. The substrate, as shown, can be attached directly to the faceplate 12 of the tube 11. In this arrangement, if the width of each optical phase elements are 40$\mu$ and the distance between each adjacent pair of phase elements 60$\mu$ (i.e., $a/X = \tfrac{2}{3}$), and further, the thickness *t*F, of the faceplate is 1.0mm with the image pickup tube being 2.54Cm, i.e., of a 1-inch size, then the OTF characteristic of the optical low pass filter will be as disclosed in FIG. 6. Additionally, this optical low pass filter can cutoff sufficiently the components of the spatial frequency higher than about 15 lines per millimeter for light in the red and blue region while allowing the light in the green region to be formed on the faceplate 12 up to high frequency components so that luminous signals can be detected up to the high frequency component of the image in the green light region and a sharp image of high resolution can be obtained.

Although the above description is directed for the embodiment shown in FIG. 7, wherein the transparent substrate 13 is directly attached to the faceplate 12 it should be realized that substantially the same result can be obtained when the low pass filter is positioned in the image forming optical system apart from the faceplate. In that case, the specific values of $a/X$ can be changed depending upon the distance from the image plane on the faceplate to the plane of the low pass filter in the optical system.

A second embodiment of the present invention can have the same construction and parameters as that of the first embodiment with the exception that the ratio $a/X = \frac{1}{2}$. The OTF characteristic of the second embodiment can be seen in FIG. 8 wherein curves (*a*), (*b*) and (*c*) represent respectively the OTF characteristics for blue ($\lambda = 450$m), green ($\lambda = 540$m) and red ($\lambda = 620$m). As can be seen from FIG. 8, the respective values reach a minimum value for a specific wavelength and then increase as the spatial frequency increases. An optical low pass filter is possible if the carrier frequency for the color signals is selected or set at or near the spatial frequency capable of providing a cutoff such as where curve (*c*) assumes a minimum value at a spatial frequency, *fr*.

Figure 8:
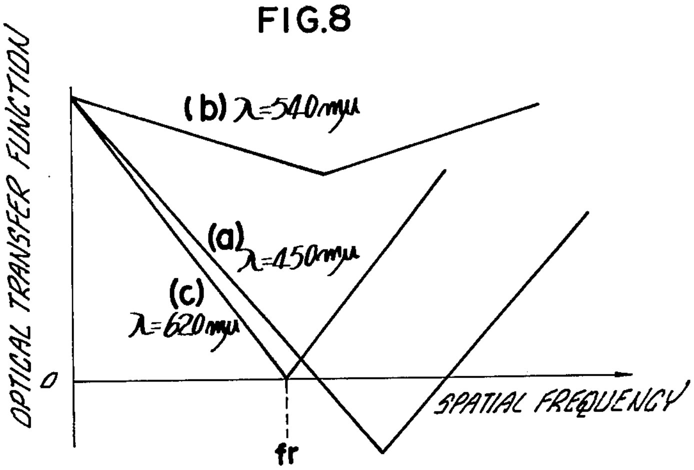
FIG. 8 is a diagram showing response function characteristics of another embodiment of the present invention, for various spectral bands.

For example, if the low pass optical filter is positioned as shown in FIG. 7 with $tF = 2.4$mm, $tL = 2.4$mm and the refractive index of the transparent substrate is 1.5 with $a = 30\mu$ and $x = 60\mu$, then the spatial frequency *fr*, where the OTF for red light is a minimum, will be 15 lines per millimeter. This would set the carrier frequency for the color signals. As can be seen in FIG. 8, the low pass filter in the second embodiment shows less of a decrease of the OTF of the green light (540m$\mu$ wavelength) and therefore permits a greater transmittance of this light. At $a/X = \frac{1}{2}$, the low pass filter will allow 50% of the red and infrared wavelengths to pass there through. Again this property of reducing the amount of the red and infrared light is capable of balancing the higher sensitivity of the color television camera 2 for the red and infrared light.

Figure 9A:
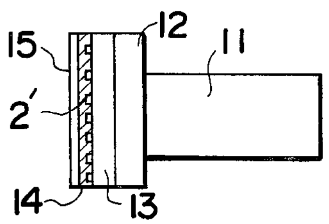
FIG. 9(A) and 9(B) shows positional arrangements of the optical low pass filters of the present invention.

FIG. 9(A) shows a schematic cross-section of a pickup tube with the combined optical filter element of the present invention mounted thereon. In the above embodiments, the optical phase elements were surrounded by an air medium. In FIG. 9(A), these optical phase elements are sandwiched between a plane parallel transparent plate 15 and a substrate 13 with the space therebetween being filled with a transparent cementing material 14 with a relatively medium index of refraction of 1.56.

Figure 9B:
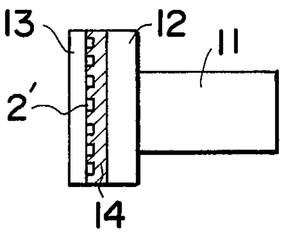

In the modified embodiment of FIG. 9(B), the substrate 13 is on the object side and the optical phase elements 2' are mounted immediately adjacent the faceplate of the image pickup tube 12. Again a transparent cement of the same refractive index as that of FIG. 9(A) can be utilized. The medium refractive index filler material can minimize light scattering.

In both of these embodiments, the optical path difference between the light passing through the phase portion and the light passing through the nonphased portion will be 235m$\mu$ and accordingly, the phase difference is 1.04$\pi$ for a blue light of 45 m$\pi$ wavelength and 0.87$\mu$ for a green light of 540m$\mu$ wavelength.

Figure 10:
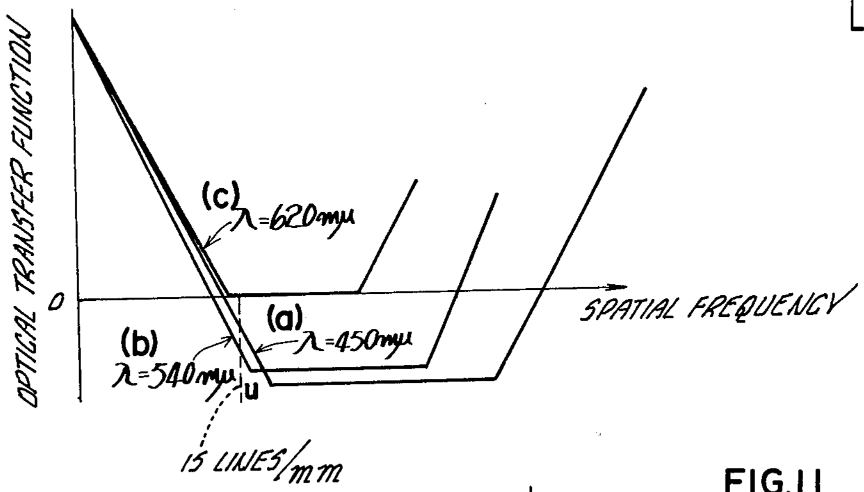
FIGS. 10 and 11 are diagrams showing the optical transfer function characteristics of the first and second embodiments, respectively, of the optical low pass filter of the invention employed in the arrangements of FIGS. 9(A) and 9(B).

If the optical low pass filter of the first embodiment is employed in these arrangements, the OTF characteristic will be represented as shown in FIG. 10 wherein all of the curves (*a*), (*b*) and (*c*) respectively for blue ($\lambda = 450$m$\mu$), green ($\lambda = 540$m$\mu$) and red ($\lambda = 620$m$\mu$) will experience a cutoff effect. It should be noted that in these embodiments the spectral transmissivity characteristic of the optical phase portions are assumed not to be affected by the cement material that surrounds the phase elements.

Figure 11:
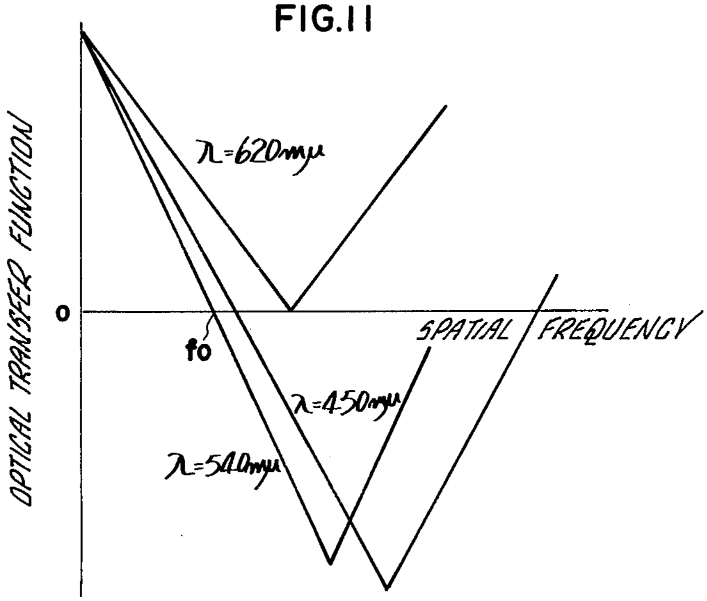

If the optical low pass filter of the second embodiment is adopted in the arrangement of either FIG. 9(A) and/or FIG. 9(B), the OTF characteristics will be as represented in FIG. 11. Again, in this case, the filter will work as a low pass filter for eliminating cross-talk between luminous and chrominance signals in the visual spectral region, if the carrier frequency for the color signals is set to or near the spatial frequency *fo*, at which the OTF for the green light of 540m$\mu$ wavelength becomes zero. It should be noted that in these arrangements, the optical low pass filter does not permit the transmission of a high frequency component of light to provide an improved resolution, however, the low pass filter does have a sharply defined low pass effect and still has the effect of reducing the amount of red and infrared light that is transmitted to the image plane of the image pickup tube.

Although the specific examples disclose optical phase portions capable of blocking the light of a wavelength longer than 600m$\mu$, the actual spectral transmissivity characteristics of the present invention can be determined in accordance with a subjective spectral sensitivity characteristic of the image pickup tube of a particular color television camera in which the low pass optical filter is to be employed. As can be fully appreciated by a person skilled in this art, the phase elements may block, instead of red and infrared wavelengths, the light of blue or the green spectral region as desired.

The actual multi-layer structure of the optical phase elements can be manufactured through various methods. For example, those methods employed for forming dichroic or color encoding filters can be used. Generally, the material for the sublayers can be selected from TiO, CeO, ZrO, etc., as high refractive index material and from MgF, $SiO_2$, etc., as low refractive index materials. The depositing of the materials on the substrate can be accomplished by ordinary evaporating techniques and photoresist techniques. As can be appreciated, the present invention is applicable not only to a one dimensional grating, but also to two dimensional low pass filters such as shown in U.S. Pat. No. 3,756,695. The present invention is also applicable to a filter wherein the phase retarding elements are arranged at random with respect to their size and spaces.

It is also possible within the parameters of the present invention to form the individual optical elements from a light absorbing type of color filter material as opposed to that of multiple layers.

While the above embodiments have been disclosed as the best mode presently contemplated by the inventors, it should be realized that these examples should not be interpreted as limiting, because artisans skilled in this field, once giving the present teachings, can vary from these specific embodiments. Accordingly, the scope of the present invention should be determined solely from the following claims in which we claim.

What is claimed is:

1. In an optical low pass filter for use in a single or double tube color television camera having a transparent substrate and a plurality of optical elements disposed on the substrate for introducing phase retardation in the light transmitted there through, the improvement comprising;

the optical elements being formed of material whose transmissivity varies with the spectral band of incident light.

2. An optical low pass filter as in claim 1 wherein each optical element has an upper planar surface and a side surface perpendicular thereto, the optical elements being positioned on the substrate to provide in at least one direction a cross-sectional rectangular waveform.

3. An optical low pass filter as in claim 1 wherein each optical element includes a plurality of layers with each layer having a different refractive index from that of an adjacent layer, the thickness and relative index of refraction of the layers permitting the transmission of a predetermined bandwidth and the reflection of another.

4. An optical low pass filter as in claim 3 wherein each optical element has at least two different layers with two respective indices of refraction.

5. An optical low pass filter as in claim 4 wherein one layer has an index of refraction of about 2.3 and the other layer has an index of refraction of about 1.38, the layers are repeated to form a total of 14 layers with respective optical thicknesses of about 175m$\mu$.

6. An optical low pass filter as in claim 5 wherein the width of each optical element forming the rectangular wave form and the relative spacing between each element has a ratio width to space of approximately 2:3.

7. An optical low pass filter as in claim 5 wherein the width of each optical element forming the rectangular waveform and the relative spacing between each element has a ratio of width to space of approximately 1:2.

8. An optical low pass filter as in claim 1 wherein the optical elements absorb a predetermined spectral bandwidth of light while passing another.

9. An optical low pass filter as in claim 1, where the optical elements are arranged in a random manner on the substrate.

10. In a single tube color television camera including an image pickup tube having a faceplate and an optical low pass filter having a transparent substrate supporting a plurality of optical elements disposed on the substrate for introducing phase retardation in transmitted light, the improvement comprising;

each optical element having a plurality of sublayers with adjacent sublayers having different refractive indices, the number of sublayers and respective optical thickness of each layer being selected to make each optical element transmissive for a predetermined spectral band of light.

11. The invention of claim 10 wherein the transparent substrate of the low pass filter is attached directly to the faceplate of the image pickup tube, the optical elements being positioned on the outward surface in a medium of air.

12. The invention of elaim 10 further including a substantially transparent filler material covering that portion of the substrate not covered by the phase retarding layer having an index of refraction greater than that of the substrate but less than at least one sublayer of the optical elements.

13. The invention of claim 12 wherein the optical elements are positioned between the substrate and the faceplate.

14. The invention of claim 10 wherein the optical elements have a transmissive characteristic to block the transmission of red and infrared wavelengths.

15. The invention of claim 10 wherein the optical elements have respectively an upper planar surface and a side surface perpendicular thereto, the optical elements being positioned on the substrate to provide in at least one direction a cross-sectional rectangular waveform, the width of each optical element having a ratio to the period of the optical elements within the following range;

$$\tfrac{1}{2} \leqq (a/X) \leqq \tfrac{3}{4}$$

16. A combination phase and amplitude optical filter for modulating light in a color television video system comprising;

a transparent substrate;

a phase retarding layer connected to the substrate and providing an optical transfer function value characteristic of cutting off the transmittance of high spatial frequency signal components of at least one or more wavelengths while passing at least another wavelength above the cutoff frequencies, the phase retarding layer further includes a plurality of optical elements, each optical element having a plurality of sublayers of respective different indices of refraction, the relative optical thicknesses and index of refraction of each layer is selected to provide a wavelength variance in the transmissivity of light energy passing through each optical element for at least two different bandwidths in the visual spectrum.

17. The invention of claim 16 wherein the phase retarding layer optical elements form a pattern covering only predetermined areas of the transparent substrate to vary the relative phase retardation of the light energy passing through the pattern and through the substrate alone.

18. The invention of claim 17 wherein the pattern phase retarding layer optical elements have at least one sublayer with an index of refraction higher than the index of refraction of the transparent substrate.

19. The invention of claim 16 wherein the pattern phase retarding layer can selectively reflect certain bandwidths in the visual spectrum.

20. The invention of claim 17 wherein the optical elements have a width, a, and a period X in the scan direction of the video system and the ratio of their values are within the following range;

$$\tfrac{1}{2} \leqq (a/X) \leqq \tfrac{3}{4}$$

21. The invention of claim 16 wherein the transmissivity of the optical elements in the red and infrared spectrum effectively blocks sufficient light energy to remove the necessity of a red-infrared compensation filter for the image pickup tube.

* * * * *

UNITED STATES PATENT AND TRADEMARK OFFICE

CERTIFICATE OF CORRECTION

PATENT NO. : 4,068,260

DATED : January 10,1978

INVENTOR(S) : Shoichi Ohneda; Yukio Okano

It is certified that error appears in the above-identified patent and that said Letters Patent are hereby corrected as shown below:

Column 2, line 31, delete "be be" and insert --best be--.

Column 8, line 1, delete "45mπ" and insert -- 450mμ --.

Column 8, line 2, delete "0.87μ" and insert --0.87π--.

Signed and Sealed this

***Thirteenth* Day of *June 1978***

[SEAL]

*Attest:*

RUTH C. MASON
*Attesting Officer*

DONALD W. BANNER
*Commissioner of Patents and Trademarks*